US009090129B2

(12) United States Patent
Horiuchi

(10) Patent No.: US 9,090,129 B2
(45) Date of Patent: Jul. 28, 2015

(54) PNEUMATIC RUN FLAT TIRE

(75) Inventor: Kenji Horiuchi, Oiwake (JP)

(73) Assignee: The Yokohama Rubber Co., LTD. (JP)

( * ) Notice: Subject to any disclaimer, the term of this patent is extended or adjusted under 35 U.S.C. 154(b) by 224 days.

(21) Appl. No.: 13/607,344

(22) Filed: Sep. 7, 2012

(65) Prior Publication Data
US 2013/0075004 A1    Mar. 28, 2013

(30) Foreign Application Priority Data

Sep. 28, 2011    (JP) ................................. 2011-213252

(51) Int. Cl.
*B60C 17/00*     (2006.01)
*B60C 15/00*     (2006.01)
(Continued)

(52) U.S. Cl.
CPC ............. *B60C 17/0027* (2013.04); *B60C 13/00* (2013.01); *B60C 15/0036* (2013.04); *B60C15/06* (2013.01); *B60C 17/0018* (2013.04); *B60C 2013/006* (2013.04); *B60C 2013/045* (2013.04); *B60C 2015/0621* (2013.04); *B60C 2017/0063* (2013.04)
(Continued)

(58) Field of Classification Search
CPC .................. B60C 17/0027; B60C 2017/0063; B60C 13/00; B60C 2013/006; B60C 15/06; B60C 2015/0621
USPC .................. 152/517, 525, 541, 547
See application file for complete search history.

(56) References Cited

U.S. PATENT DOCUMENTS 6,182,728 B1 *  2/2001  Williams et al. .............. 152/517
6,843,293 B1 *  1/2005  Corvasce et al. ......... 152/517 X
(Continued)

FOREIGN PATENT DOCUMENTS

DE    10 2004 060 468 A1 *  7/2006
DE    10 2006 028 829 A1 * 12/2007
(Continued)

*Primary Examiner* — Adrienne C Johnstone
(74) *Attorney, Agent, or Firm* — Thorpe North & Western

(57) ABSTRACT

In a pneumatic run flat tire in which an inner side reinforcing rubber layer having a falcated cross-section is disposed in a side wall portion, dynamic elastic moduli $E'_{10A}$, $E'_{10B}$, and $E'_{10C}$ and values $T_{10A}$, $T_{10B}$, and $T_{10C}$ of a tan δ at 60° C. of rubber compositions of each region of the inner side reinforcing rubber layer are configured so as to satisfy the relationships $E'_{10A} < E'_{10B} < E'_{10C}$, $E'_{10A} \geq 4.0$ MPa, $T_{10A} < T_{10B} < T_{10C}$, and $T_{10A} \leq 0.06$. Dynamic elastic moduli $E'_{20A}$, $E'_{20B}$, and $E'_{20C}$ at 60° C. of rubber compositions of each region of the outer side rubber layer are configured so as to satisfy the relationships $E'_{20B} < E'_{20A} \leq E'_{20C}$ and $E'_{20C}/E'_{20B} \geq 1.6$. Furthermore, the dynamic elastic modulus ratios $E'_{20A}/E'_{10A}$ and $E'_{20C}/E'_{10C}$ are configured so as to satisfy the relationships $0.6 \leq E'_{20A}/E'_{10A} \leq 1.0$ and $0.6 \leq E'_{20C}/E'_{10C} \leq 1.0$.

13 Claims, 2 Drawing Sheets

(51) Int. Cl.
*B60C 13/00* (2006.01)
*B60C 15/06* (2006.01)

(56) References Cited

U.S. PATENT DOCUMENTS 7,255,146 B2 * 8/2007 Kirby ........................... 152/517
7,740,037 B2 * 6/2010 Yamashita

FOREIGN PATENT DOCUMENTS

| JP | 2006264492 A | * 10/2006 |
| JP | 2007331435 A | * 12/2007 |
| JP | 2007331436 A | * 12/2007 |
| JP | 2010-023823 | 2/2010 |
| JP | 2010274684 A | * 12/2010 |

* cited by examiner

PNEUMATIC RUN FLAT TIRE

PRIORITY CLAIM

Priority is claimed to Japan Patent Application Serial No. 2011-213252 filed on Sep. 28, 2011.

BACKGROUND

1. Technical Field

The present technology relates to a pneumatic run flat tire and more particularly relates to a pneumatic run flat tire by which both riding comfort when regular traveling and run-flat durability can be achieved at high levels.

2. Related Art

With pneumatic tires, a side-reinforced pneumatic run flat tire in which a reinforcing rubber layer having a falcated cross-section is inserted on an inner face of a side wall portion, and by which run-flat traveling is made possible based on the rigidity of this reinforcing rubber layer is known (e.g. see Japanese Unexamined Patent Application Publication No. 2010-023823A). With such a side reinforced pneumatic run flat tire, there is a benefit in that run-flat traveling is achieved based on the tire structure without depending on a support body such as an inner ring or the like attached to the wheel, but there is also a problem in that the rigidity of the side wall portion is higher than that of a regular tire and, therefore, riding comfort when regular traveling is negatively affected.

Therefore, in recent years, what are referred to as "soft run-flat tires" have been used in which the same degree of riding comfort as in a tire that does not have a reinforcing rubber layer is maintained while at least the minimum necessary run-flat durability is ensured by miniaturizing the reinforcing rubber layer as much as possible without inhibiting run-flat durability or reducing the rigidity. However, with such a run flat tire in which the reinforcing rubber layer is miniaturized or the rigidity thereof is reduced, the run-flat durability may decline severely, and there remains room for improvement in achieving both run-flat durability and riding comfort when regular traveling.

SUMMARY

The present technology provides a pneumatic run flat tire by which both riding comfort when regular traveling and run-flat durability can be achieved at high levels. A pneumatic run flat tire includes a carcass layer mounted between a pair of left and right bead portions, a belt layer disposed on an outer circumferential side of the carcass layer in a tread portion, and an inner side reinforcing rubber layer having a falcated cross-section disposed on an inner side in a tire width direction of the carcass layer in a side wall portion. In this pneumatic run flat tire, an outer side rubber layer and the inner side reinforcing rubber layer positioned on an outer side in the tire width direction of the carcass layer in the side wall portion are divided into an external diameter side region, a middle region, and an internal diameter side region, which are respectively laminated in a tire radial direction such that the external diameter side region is in contact with the middle region and the middle region is in contact with the internal diameter side region. Additionally, a dynamic elastic modulus $E'_{10A}$ at 60° C. of a rubber composition included in the external diameter side region of the inner side reinforcing rubber layer, a dynamic elastic modulus $E'_{10B}$ at 60° C. of a rubber composition included in the middle region of the inner side reinforcing rubber layer, and a dynamic elastic modulus $E'_{10C}$ at 60° C. of a rubber composition included in the internal diameter side region of the inner side reinforcing rubber layer are configured so as to satisfy the relationships $E'_{10A} < E'_{10B} < E'_{10C}$ and $E'_{10A} \geq 4.0$ MPa; a value $T_{10A}$ of a tan δ at 60° C. of the rubber composition included in the external diameter side region of the inner side reinforcing rubber layer, a value $T_{10B}$ of a tan δ at 60° C. of the rubber composition included in the middle region of the inner side reinforcing rubber layer, and a value $T_{10C}$ of a tan δ at 60° C. of the rubber composition included in the internal diameter side region of the inner side reinforcing rubber layer are configured so as to satisfy the relationships $T_{10A} < T_{10B} < T_{10C}$ and $T_{10A} \leq 0.06$; a dynamic elastic modulus $E'_{20A}$ at 60° C. of a rubber composition included in the external diameter side region of the outer side rubber layer, a dynamic elastic modulus $E_{20B}$ at 60° C. of a rubber composition included in the middle region of the outer side rubber layer, and a dynamic elastic modulus $E_{20C}$ at 60° C. of a rubber composition included in the internal diameter side region of the outer side rubber layer are configured so as to satisfy the relationships $E_{20B} < E_{20A} \leq E_{20C}$ and $E'_{20C}/E'_{20B} \geq 1.6$; and a ratio $E_{20A}/E'_{10A}$ of the dynamic elastic modulus $E_{20A}$ at 60° C. of the rubber composition included in the external diameter side region of the outer side rubber layer to the dynamic elastic modulus $E'_{10A}$ at 60° C. of the rubber composition included in the external diameter side region of the inner side reinforcing rubber layer, and a ratio $E'_{20C}/E'_{10C}$ of the dynamic elastic modulus $E_{20C}$ at 60° C. of the rubber composition included in the internal diameter side region of the outer side rubber layer to the dynamic elastic modulus $E_{10C}$ at 60° C. of the rubber composition included in the internal diameter side region of the inner side reinforcing rubber layer are configured so as to satisfy the relationships $0.6 \leq E'_{20A}/E'_{10A} \leq 1.0$ and $0.6 \leq E'_{20C}/E'_{10C} \leq 1.0$.

In the present technology, riding comfort when regular traveling and run-flat durability are enhanced by forming the outer side rubber layer and the inner side reinforcing rubber layer respectively from three different types of rubber compositions, laminated in the radial direction, and defining size relationships of the dynamic elastic modulus E' and the tan δ at 60° C. between these rubber compositions, as described above. Specifically, tensile deformation accompanied by a large amount of deformation is generated in the inner side reinforcing rubber layer when an identical external force acts on the internal diameter side region on the bead side and, therefore, tensile deformation can be suppressed by disposing a rubber composition having a high dynamic elastic modulus E' at 60° C. Additionally, while compressive deformation is generated in the inner side reinforcing rubber layer when an identical external force acts on the external diameter side region on the tread side, the amount of deformation is small and, therefore, heat build-up caused by repeated deformation, not the compressive deformation itself, can be suppressed by disposing a rubber composition having a low tan δ. On the other hand, it is not necessary to proactively suppress heat build-up in the outer side rubber layer, because it is expected that heat dissipation will occur because the outer side rubber layer is exposed to the outside. Therefore, by relatively increasing the tensile deformation of the external diameter side region on the tread side and the dynamic elastic modulus E' at 60° C. of the internal diameter side region on the bead side, compressive deformation in each of these regions can be suppressed. As a result, rubber compositions having appropriate physical properties with respect to the deformation at each site can be disposed, and riding comfort when regular traveling can be enhanced and run-flat durability can be enhanced.

In the present technology, a ratio $V_{10C}/(V_{10B}+V_{10B})$ of a volume $V_{10C}$ of the internal diameter side region of the inner side reinforcing rubber layer to a sum of a volume $V_{10A}$ of the external diameter side region of the inner side reinforcing rubber layer and a volume $V_{10B}$ of the middle region of the inner side reinforcing rubber layer is preferably configured so as to satisfy the relationship $0.8 \leq V_{10C}/(V_{10A}+V_{10B}) \leq 1.2$; a ratio $V_{20A}/V_{20B}$ of the volume $V_{20A}$ of the external diameter side region of the outer side rubber layer to the volume $V_{20B}$ of the middle region of the outer side rubber layer is preferably configured so as to satisfy the relationship $0.8 \leq V_{20A}/V_{20B} \leq 1.2$; and a ratio $V_{20C}/V_{20B}$ of the volume $V_{20C}$ of the internal diameter side region of the outer side rubber layer to the volume $V_{20B}$ of the middle region of the outer side rubber layer is preferably configured so as to satisfy the relationship $0.8 \leq V_{20C}/V_{20B} \leq 1.2$. As a result, the volume of the internal diameter side region of the inner side reinforcing rubber layer can be set so as to be great and, therefore, bead vicinity rigidity, which contributes greatly to run-flat durability, can be increased and run-flat durability can be enhanced. Additionally, sites of the outer side rubber layer where deformation occurs can be reliably covered by a rubber having a high dynamic elastic modulus at 60° C. As a result, higher levels of both run-flat durability and riding comfort when regular traveling can be achieved.

In the present technology, an outer side reinforcing rubber layer preferably is provided throughout the internal diameter side region and the middle region of the outer side rubber layer on an outer side in the tire width direction of the carcass layer and on an inner side in the tire width direction of the outer side rubber layer. As a result, the bead vicinity can be reinforced and run-flat durability can be maintained even when the volume of the inner side reinforcing rubber layer, the outer side rubber layer, and the bead fillers is reduced. Particularly, because such an outer side reinforcing rubber layer is not highly sensitive to vertical spring, riding comfort when regular traveling can be enhanced without sacrificing run-flat durability.

A value $T_{30}$ of a tan δ at 60° C. of a rubber composition constituting the outer side reinforcing rubber layer is preferably from 0.01 to 0.06, and a dynamic elastic modulus $E'_{30}$ at 60° C. of the rubber composition constituting the outer side reinforcing rubber layer is preferably from 0.8 to 1.2 times the dynamic elastic modulus $E'_{10C}$ at 60° C. of the rubber composition included in the internal diameter side region of the inner side reinforcing rubber layer. When within this range, run-flat durability can be further enhanced.

Note that, in the present technology, "tan δ at 60° C." refers to a tan δ measured in accordance with JIS (Japanese Industrial Standard) K6394 using a viscoelastic spectrometer (manufactured by Toyo Seiki Seisaku-sho, Ltd.) under the following conditions: Temperature=60° C.; Frequency 20 Hz; Static distortion=10%; Dynamic distortion=±2%. Additionally, in the present technology, "dynamic elastic modulus E' at 60° C." refers to a dynamic elastic modulus measured in accordance with JIS K6394 using the same viscoelastic spectrometer (manufactured by Toyo Seiki Seisaku-sho, Ltd.) mentioned above under the following conditions: Temperature=60° C.; Frequency=20 Hz; Static distortion=10%; Dynamic distortion=±2%.

DETAILED DESCRIPTION

Detailed descriptions will be given below of a configuration of the present technology with reference to the accompanying drawings.

Figure 1:
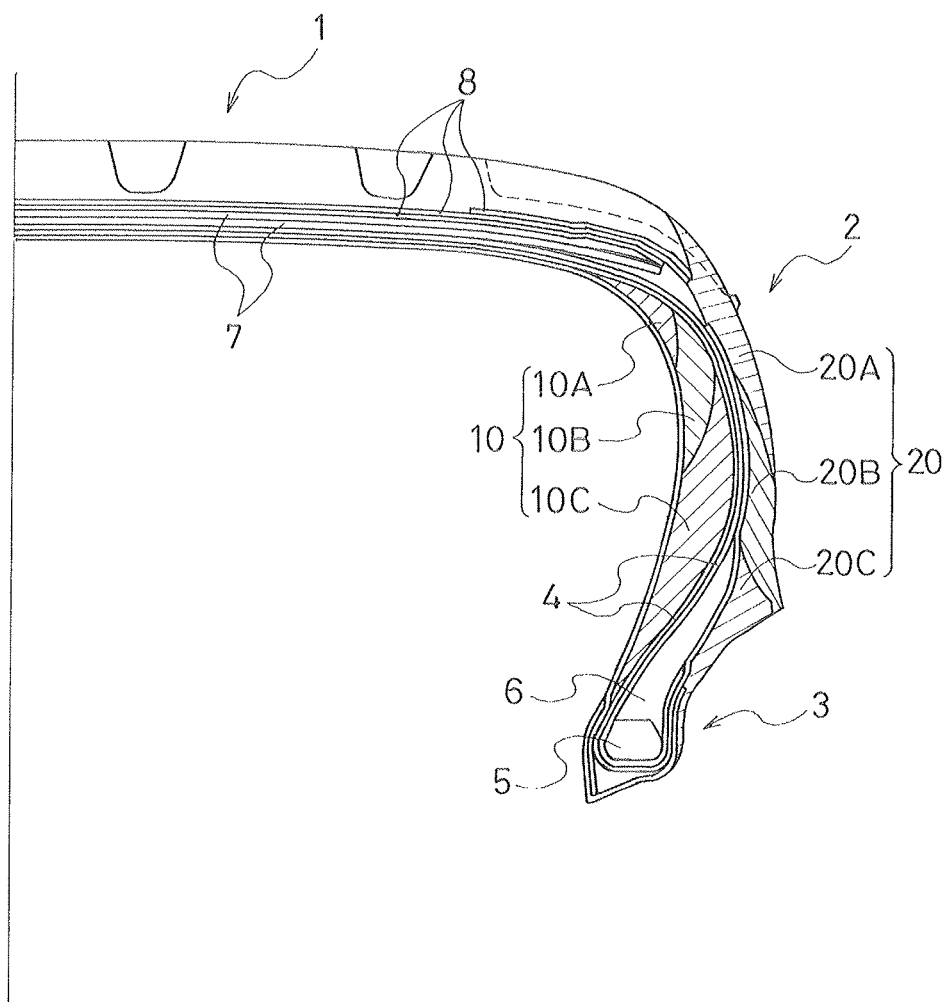
FIG. 1 is a meridian cross-sectional view illustrating a half of a pneumatic run flat tire according to an embodiment of the present technology.

FIG. 1 illustrates a pneumatic run flat tire according to an embodiment of the present technology. In FIG. 1, 1 is a tread portion; 2 is a side wall portion; and 3 is a bead portion. Two layers of a carcass layer 4 are mounted between a pair of left and right bead portions 3,3. Ends of the carcass layer 4 are folded around bead cores 5 from a tire inner side to a tire outer side. A bead filler 6 having a triangular cross-sectional shape formed from rubber is disposed on an outer circumferential side of the bead cores 5. Two layers of a belt layer 7 are disposed throughout an entirety of a circumference of the tire on the outer circumferential side of the carcass layer 4 in the tread portion 1. These belt layers 7 include reinforcing cords that incline with respect to a tire circumferential direction and the reinforcing cords are disposed between the layers so as to intersect each other. Furthermore, a belt cover layer 8 is disposed on an outer circumferential side of the belt layers 7. The belt cover layer 8 includes a reinforcing cord that is disposed in the tire circumferential direction, and is constituted by continuously wrapping the reinforcing cord in the tire circumferential direction.

In this pneumatic tire, an inner side reinforcing rubber layer 10 having a falcated cross-section and being formed from rubber is disposed on an inner side in a tire width direction of the carcass layer 4 in the side wall portion 2. The inner side reinforcing rubber layer 10 is configured so as to be harder than the other rubber of the side wall portion 2. A load when run-flat traveling is supported based on the rigidity of the inner side reinforcing rubber layer 10 as a result of providing the inner side reinforcing rubber layer 10 having a falcated cross-section described above. The present technology is applied to such a side reinforced type of pneumatic run flat tire, however the specific structure thereof is not limited to the basic structure described above.

In the present technology, the inner side reinforcing rubber layer 10 is divided into three sections in a tire radial direction and is constituted by an external diameter side region 10A, a middle region 10B, and an internal diameter side region 10C. A dynamic elastic modulus $E'_{10B}$ at 60° C. of a rubber composition included in the external diameter side region 10A of the inner side reinforcing rubber layer 10, a dynamic elastic modulus $E'_{10B}$ at 60° C. of a rubber composition included in the middle region 10B of the inner side reinforcing rubber layer 10, and a dynamic elastic modulus $E'_{10C}$ at 60° C. of a rubber composition included in the internal diameter side region 10C of the inner side reinforcing rubber layer 10 are configured so as to satisfy the relationships $E'_{10A} < E'_{10B} < E'_{10C}$ and $E'_{10A} \geq 4.0$ MPa.

Additionally, a value $T_{10A}$ of a tan δ at 60° C. of the rubber composition included in the external diameter side region 10A of the inner side reinforcing rubber layer 10, a value $T_{10B}$ of a tan δ at 60° C. of the rubber composition included in the middle region 10B of the inner side reinforcing rubber layer 10, and a value $T_{10C}$ of a tan δ at 60° C. of the rubber composition included in the internal diameter side region 10C of the inner side reinforcing rubber layer 10 are configured so as to satisfy the relationships $T_{10A} < T_{10B} < T_{10C}$ and $T_{10A} \leq 0.06$.

By configuring the dynamic elastic moduli E' and the tan δ at 60° C. of the rubber compositions constituting each of the regions 10A, 10B, and 10C of the inner side reinforcing rubber layer 10 as described above, the physical properties of each of the rubber compositions can be configured depending on the deformation characteristics of each of the regions 10A, 10B, and 10C. Therefore, run-flat durability and riding comfort when regular traveling can be enhanced. That is, tensile deformation accompanied by a large amount of deformation is generated when an identical external force acts on the internal diameter side region 10C of the inner side reinforcing rubber layer 10. Therefore, a rubber composition having a high dynamic elastic modulus E' at 60° C. is disposed so that this tensile deformation will be suppressed. Additionally, while compressive deformation is generated when an identical external force acts on the external diameter side region 10A of the inner side reinforcing rubber layer 10, the amount of deformation is small. Therefore, a rubber composition having a low tan δ is disposed so that heat build-up caused by repeated deformation, not the compressive deformation itself will be suppressed.

If the size relationships between the dynamic elastic moduli $E'_{10A}$, $E'_{10B}$, and $E'_{10C}$ of the rubber compositions of the regions 10A, 10B, and 10C are reversed, it will not be possible to sufficiently suppress the deformation in each region as described above. Moreover, if the size relationships between the values $T_{10A}$, $T_{10B}$, and $T_{10C}$ of the tan δ are reversed, it will not be possible to sufficiently suppress the heat build-up in each region as described above. As a result, both run-flat durability and riding comfort when regular traveling cannot be achieved. Additionally, if the dynamic elastic modulus $E'_{10A}$ at 60° C. of the rubber composition included in the external diameter side region 10A of the inner side reinforcing rubber layer 10 is such that $E'_{10A} < 4.0$ MPa, it will not be possible to sufficiently suppress the tensile deformation occurring in the corresponding region, and run-flat durability cannot be ensured. Likewise, if the value $T_{10A}$ of the tan δ at 60° C. of the rubber composition included in the external diameter side region 10A of the inner side reinforcing rubber layer 10 is such that $T_{10A} > 0.06$, it will not be possible to sufficiently suppress the heat build-up caused by repeated deformation occurring in the corresponding region, and run-flat durability cannot be ensured.

A ratio $E'_{10C}/E'_{10A}$ of the dynamic elastic modulus $E'_{10C}$ at 60° C. of a rubber composition included in the internal diameter side region 10C of the inner side reinforcing rubber layer 10 to the dynamic elastic modulus $E'_{10A}$ at 60° C. of the rubber composition included in the external diameter side region 10A of the inner side reinforcing rubber layer 10 is preferably configured so as to satisfy the relationship $E'_{10C}/E'_{10A} \geq 1.5$.

If the ratio $E'_{10C}/E'_{10A}$ is such that $E'_{10C}/E'_{10A} < 1.5$, the effect caused by providing the dynamic elastic modulus E' with a gradient will be insufficient.

On the other hand, as with the inner side reinforcing rubber layer 10, the outer side rubber layer 20 is also divided into three sections in the tire radial direction and is constituted by an external diameter side region 20A, a middle region 20B, and an internal diameter side region 20C. A dynamic elastic modulus $E'_{20A}$ at 60° C. of a rubber composition included in the external diameter side region 20A of the outer side rubber layer 20, a dynamic elastic modulus $E'_{20B}$ at 60° C. of a rubber composition included in the middle region 20B of the outer side rubber layer 20, and a dynamic elastic modulus $E'_{20C}$ at 60° C. of a rubber composition included in the internal diameter side region 20C of the outer side rubber layer 20 are configured so as to satisfy the relationships $E'_{20B} < E'_{20A} \leq E'_{20C}$ and $E'_{20C}/E'_{20B} \geq 1.6$.

By configuring the dynamic elastic moduli E' at 60° C. of the rubber compositions constituting each of the regions 20A, 20B, and 20C of the outer side rubber layer 20 as described above, the physical properties of each of the rubber compositions can be configured depending on the deformation characteristics of each of the regions 20A, 20B, and 20C. Therefore, run-flat durability and riding comfort when regular traveling can be enhanced. Specifically, it is not necessary to proactively suppress heat build-up in the outer side rubber layer 20 because it is expected that heat dissipation will occur because the outer side rubber layer 20 is in contact with outside air. Moreover, the dynamic elastic moduli E' at 60° C. of the external diameter side region 20A and the internal diameter side region 20C are relatively increased so that the tensile deformation in the external diameter side region 20A and the compressive deformation in the internal diameter side region 20C are respectively suppressed. As a result, rubber compositions having appropriate physical properties with respect to the deformation at each site can be disposed, and riding comfort when regular traveling can be enhanced and run-flat durability can be enhanced.

If the size relationships between the dynamic elastic moduli $E'_{20A}$, $E'_{20B}$, and $E'_{20C}$ of the rubber compositions of the regions 20A, 20B, and 20C are reversed, it will not be possible to sufficiently suppress the deformation in each region as described above. As a result, both run-flat durability and riding comfort when regular traveling cannot be achieved. Additionally, if the ratio $E'_{20C}/E'_{20B}$ of the dynamic elastic modulus $E'_{20C}$ at 60° C. of the rubber composition included in the internal diameter side region 20C of the outer side rubber layer 20 to the dynamic elastic modulus $E'_{20B}$ at 60° C. of the rubber composition included in the middle region 20B is configured so that $E'_{20C}/E'_{20B} < 1.6$, a difference between the dynamic elastic moduli at 60° C. will be too small and, as a result, it will not be possible to sufficiently suppress the deformation occurring in the corresponding region, and run-flat durability cannot be ensured.

Furthermore, a ratio $E'_{20A}/E'_{10A}$ of the dynamic elastic modulus $E'_{20A}$ at 60° C. of a rubber composition included in the external diameter side region 20A of the outer side rubber layer 20 to the dynamic elastic modulus $E'_{10A}$ at 60° C. of the rubber composition included in the external diameter side region 10A of the inner side reinforcing rubber layer 10; and a ratio $E'_{20C}/E'_{10C}$ of the dynamic elastic modulus $E'_{20C}$ at 60° C. of the rubber composition included in the internal diameter side region 20C of the outer side rubber layer 20 to the dynamic elastic modulus $E'_{10C}$ at 60° C. of a rubber composition included in the internal diameter side region 10C of the inner side reinforcing rubber layer 10 are configured so as to satisfy the relationships $0.6 \leq E'_{20A}/E'_{10A} \leq 1.0$ and $0.6 \leq E'_{20C}/E'_{10C} \leq 1.0$.

By configuring the relationships of the dynamic elastic moduli at 60° C. of identical regions in the radial direction of the inner side reinforcing rubber layer 10 and the outer side rubber layer 20 as described above, run-flat durability can be enhanced with the minimum necessary reinforcement. Specifically, if the ratio $E'_{20A}/E'_{10A}$ and the ratio $E'_{20C}/E'_{10C}$ are each less than 0.6, the dynamic elastic modulus at 60° C. of the outer side rubber layer 20 will be too small with respect to the dynamic elastic modulus at 60° C. of the inner side reinforcing rubber layer 10. As a result, failures originating from the outer side rubber layer 20 will occur easily, and run-flat durability will decline. Conversely, if the ratio $E'_{20A}/E'_{10A}$ and the ratio $E'_{20C}/E'_{10C}$ are each greater than 1.0, the dynamic elastic modulus at 60° C. of the outer side rubber layer 20 will be too large with respect to the dynamic elastic modulus at 60° C. of the inner side reinforcing rubber layer 10, and will result in excessive reinforcement.

The inner side reinforcing rubber layer 10 and the outer side rubber layer 20 are each divided into three regions that are laminated in the tire radial direction, but provided that the relationships described above are satisfied, each of the regions may be divided further into smaller regions and the dynamic elastic moduli and tan δ at 60° C. between these regions may be varied. However, when obtaining the effects described above using the minimum necessary material is considered from the standpoints of productivity and cost, the inner side reinforcing rubber layer 10 and the outer side rubber layer 20 are preferably each divided into three regions that are laminated in the tire radial direction, as described above.

In the present technology, volumes of the regions 10A, 10B, and 10C of the inner side reinforcing rubber layer 10 and the regions 20A, 20B, and 20C of the outer side rubber layer 20 are preferably configured as described below. That is, a ratio $V_{10C}/(V_{10A}+V_{10B})$ of a volume $V_{10C}$ of the internal diameter side region 10C of the inner side reinforcing rubber layer 10 to a sum of a volume $V_{10A}$ of the external diameter side region 10A of the inner side reinforcing rubber layer 10 and a volume $V_{10B}$ of the middle region 10B of the inner side reinforcing rubber layer 10 is preferably configured so as to satisfy the relationship $0.8 \leq V_{10C}/(V_{10A}+V_{10B}) \leq 1.2$. Additionally, a ratio $V_{20A}/V_{20B}$ of the volume $V_{20A}$ of the external diameter side region 20A of the outer side rubber layer 20 to the volume $V_{20B}$ of the middle region 20B of the outer side rubber layer 20 is preferably configured so as to satisfy the relationship $0.8 \leq V_{20A}/V_{20B} \leq 1.2$; and a ratio $V_{20C}/V_{20B}$ of the volume $V_{20C}$ of the internal diameter side region 20C of the outer side rubber layer 20 to the volume $V_{20B}$ of the middle region 20B of the outer side rubber layer 20 is preferably configured so as to satisfy the relationship $0.8 \leq V_{20C}/V_{20B} \leq 1.2$.

By configuring the volume ratios as described above, the volume of the internal diameter side region 10C of the inner side reinforcing rubber layer 10 can be set so as to be great and, therefore, bead vicinity rigidity, which contributes greatly to run-flat durability, can be increased and run-flat durability can be enhanced. Additionally, higher levels of both run-flat durability and riding comfort when regular traveling can be achieved because the external diameter side region 20A and the internal diameter side region 20C, where deformation occurs, of the outer side rubber layer 20 can be reliably covered by the rubber having a high dynamic elastic modulus at 60° C.

If the volume ratio $V_{10C}/(V_{10A}+V_{10B})$ in the inner side reinforcing rubber layer 10 is less than 0.8, it will not be possible to sufficiently increase the bead vicinity rigidity, which contributes greatly to run-flat durability, and run-flat durability will decline. If the volume ratio $V_{10C}/(V_{10A}+V_{10B})$ in the inner side reinforcing rubber layer 10 is greater than 1.2, riding comfort when regular traveling will decline. If the volume ratio $V_{20A}/V_{20B}$ in the outer side rubber layer 20 is less than 0.8, it will not be possible to sufficiently cover the external diameter side region, where tensile deformation is great, with the rubber composition that has a high dynamic elastic modulus at 60° C., which will lead to a decline in run-flat durability. If the volume ratio $V_{20A}/V_{20B}$ in the outer side rubber layer 20 is greater than 1.2, the region where the rubber composition that has a high dynamic elastic modulus at 60° C. is disposed will be excessively large, and riding comfort when regular traveling will decline. If the volume ratio $V_{20C}/V_{20B}$ in the outer side rubber layer 20 is less than 0.8, it will not be possible to sufficiently cover a rim flange with the rubber composition that has a high dynamic elastic modulus at 60° C., which will lead to a decline in run-flat durability. If the volume ratio $V_{20C}/V_{20B}$ in the outer side rubber layer 20 is greater than 1.2, the region where the rubber composition that has a high dynamic elastic modulus at 60° C. is disposed will be excessively large, and riding comfort when regular traveling will decline.

More preferably, the ratio $V_{10A}/V_{10B}$ of the volume $V_{10A}$ of the external diameter side region 10A of the inner side reinforcing rubber layer 10 to the volume $V_{10B}$ of the middle region 10B of the inner side reinforcing rubber layer 10 is configured such that $0.8 \leq V_{10A}/V_{10B} \leq 1.2$. If the volume ratio $V_{10A}/V_{10B}$ in the inner side reinforcing rubber layer 10 is less than 0.8, the external diameter side region 10A of the inner side reinforcing rubber layer 10 where the rubber composition having a low tan δ at 60° C. is disposed will be excessively small. As a result, it will not be possible to sufficiently suppress heat build-up and run-flat durability will decline. If the volume ratio $V_{10A}/V_{10B}$ in the inner side reinforcing rubber layer 10 is greater than 1.2, the external diameter side region 10A of the inner side reinforcing rubber layer 10 where the rubber composition having a low tan δ at 60° C. is disposed will be excessively large and the other regions will become smaller. As a result, it will not be possible to achieve both run-flat durability and riding comfort when regular traveling.

Figure 2:
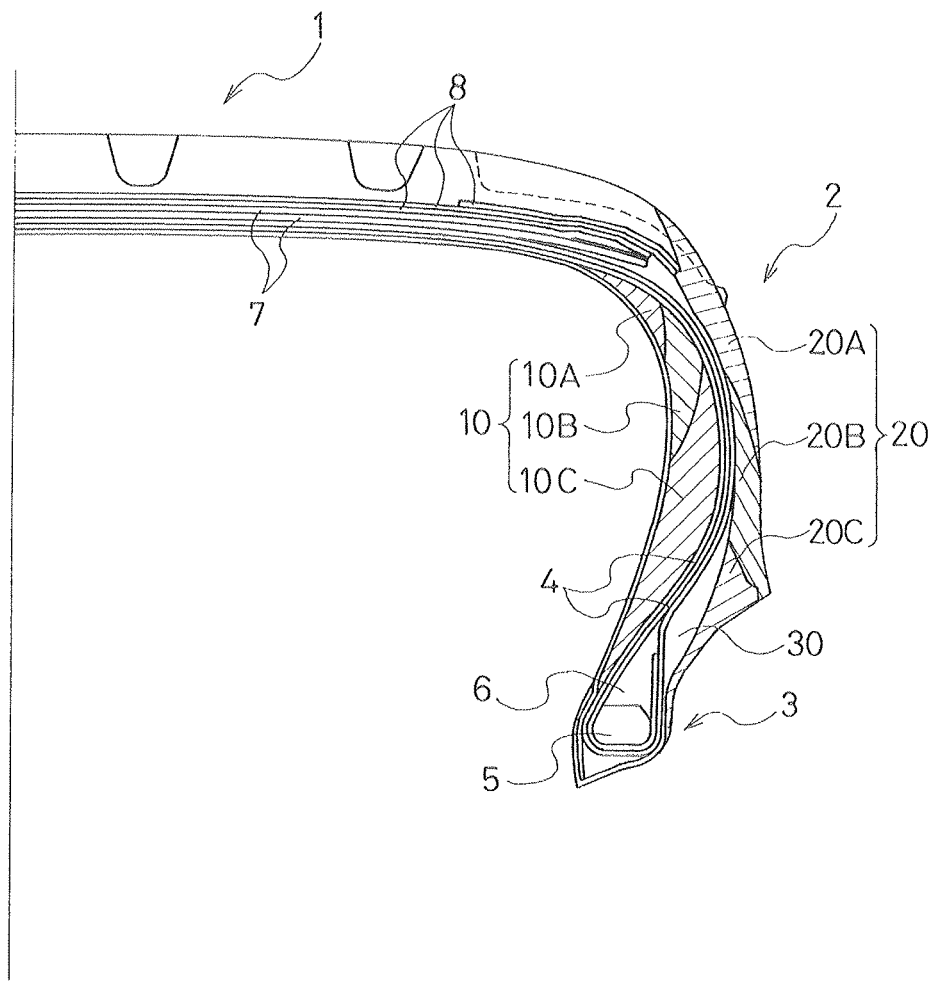
FIG. 2 is a meridian cross-sectional view illustrating a half of a pneumatic run flat tire according to another embodiment of the present technology.

In the present technology, in contrast with the pneumatic run-flat tire having the structure described above, as illustrated in FIG. 2, an outer side reinforcing rubber layer 30 preferably is further provided throughout the internal diameter side region 20C and the middle region 20B of the outer side rubber layer 20 on the outer side in the tire width direction of the carcass layer 4 and on the inner side in the tire width direction of the outer side rubber layer 20.

By providing such an outer side reinforcing rubber layer 30, the volume of the inner side reinforcing rubber layer 10, the outer side rubber layer 20, and the bead filler 6 can be reduced. That is, because the outer side reinforcing rubber layer 30 is not highly sensitive to vertical spring, the bead vicinity is reinforced by the outer side reinforcing rubber layer 30 instead of by the inner side reinforcing rubber layer 10, the outer side rubber layer 20, and the bead filler 6 and, therefore, riding comfort when regular traveling can be further enhanced without causing a reduction in run-flat durability.

For the rubber composition constituting the outer side reinforcing rubber layer 30, a value $T_{30}$ of a tan δ at 60° C. is preferably from 0.01 to 0.06, and a dynamic elastic modulus $E'_{30}$ at 60° C. is preferably from 0.8 to 1.2 times the dynamic elastic modulus $E'_{10C}$ at 60° C. of the rubber composition included in the internal diameter side region 10C of the inner side reinforcing rubber layer 10.

By configuring the physical properties of the outer side reinforcing rubber layer 30 as described above, heat build-up can be suppressed while ensuring at least a certain elastic modulus, breakage in the vicinity of the reinforcing rubber layer can be effectively suppressed, and run-flat durability can be further enhanced. As a result, the volumes of the inner side reinforcing rubber layer 10, the outer side rubber layer 20, the bead filler 6, and other tire components that contribute to run-flat durability can be reduced and riding comfort when regular traveling can be enhanced while maintaining a high level of run-flat durability.

If the value $T_{30}$ of the tan δ is less than 0.01, productivity of the pneumatic run flat tire will be negatively affected. If the value $T_{30}$ of the tan δ is greater than 0.06, it will not be possible to sufficiently suppress heat build-up and run-flat durability will decline. If the dynamic elastic modulus $E'_{30}$ is less than 0.8 times the dynamic elastic modulus $E'_{10C}$, the dynamic elastic modulus will be insufficient, the outer side reinforcing rubber layer 30 will not function as a reinforcing layer, and run-flat durability will decline. If the dynamic elastic modulus $E'_{30}$ is greater than 1.2 times the dynamic elastic modulus $E'_{10C}$, vertical rigidity of the side wall portion 2 will increase and, as a result, riding comfort when regular traveling will decrease.

EXAMPLES

Eight types of test tires were fabricated for Conventional Example 1, Comparative Example 1, and Working Examples 1 to 6. Each of these pneumatic run flat tires had a tire size of 245/45R17. For the inner side reinforcing rubber layer, the number of layers, the value $T_{10B}$ of the tan δ and the dynamic elastic modulus $E'_{10A}$ at 60° C. of the external diameter side region, the value $T_{10B}$ of the tan δ and the dynamic elastic modulus $E'_{10B}$ at 60° C. of the middle region, and the value $T_{10C}$ of the tan δ and the dynamic elastic modulus $E'_{10C}$ at 60° C. of the internal diameter side region were configured for each test tire as shown in Table 1. Additionally, for the outer side rubber layer, the number of layers, the dynamic elastic modulus $E'_{20A}$ at 60° C. of the external diameter side region, the dynamic elastic modulus $E'_{20B}$ at 60° C. of the middle region, and the dynamic elastic modulus $E'_{20C}$ at 60° C. of the internal diameter side region were configured for each test tire as shown in Table 1. Moreover, for the outer side reinforcing rubber layer, presence/absence, the value $T_{30}$ of the tan δ and the dynamic elastic modulus $E'_{30}$ at 60° C. were configured for each test tire as shown in Table 1. Furthermore, the volume ratios $V_{10C}/(V_{10A}+V_{10B})$, $V_{20A}/V_{20B}$, and $V_{20C}/V_{20B}$ were configured for each test tire as shown in Table 1.

Run-flat durability and riding comfort when regular traveling were evaluated for each of the eight types of tires according to the methods described below. The results are shown in Table 1.

Run-Flat Durability

Each test tire was assembled on a measured rim (size: 17×8.0 J), mounted on a vehicle, and inflated to an air pressure of 230 kPa. The valve core of the right side drive axle tire (one of the four tires) was removed and the vehicle was run on an asphalt road surface test course at an average speed of 80 km/h. Running was continued until the driver felt vibration caused by the breakdown of the tire. Run-flat durability was measured based on the average running distance. Three test drivers performed this measurement and the results were averaged and recorded in Table 1 as evaluations of run-flat durability. Evaluation results were expressed as index values, Conventional Example 1 being assigned an index value of 100. Larger index values indicate superior run-flat durability.

Riding Comfort when Regular Traveling

Each test tire was assembled on a measured rim (size: 17×8.0 J), mounted on a vehicle, and all of the tires were inflated to an air pressure of 230 kPa. Sensory evaluation by a test driver for riding comfort when regular traveling was performed on a test course. Evaluation results were expressed as index values, Conventional Example 1 being assigned an index value of 100. Larger index values indicate superior riding comfort when regular traveling.

TABLE 1

| | | | Conventional Example 1 | Comparative Example 1 |
|---|---|---|---|---|
| Inner side reinforcing rubber layer | Number of layers | | 1 | 3 |
| | External diameter side region | $T_{10A}$ | 0.08 | 0.06 |
| | | $E'_{10A}$ (MPa) | 9.0 | 9.0 |
| | Middle region | $T_{10B}$ | 0.08 | 0.05 |
| | | $E'_{10B}$ (MPa) | 9.0 | 6.0 |
| | Internal diameter side region | $T_{10C}$ | 0.08 | 0.04 |
| | | $E'_{10C}$ (MPa) | 9.0 | 5.0 |
| Outer side rubber layer | Number of layers | | 2 | 3 |
| | External diameter side region | $E'_{20A}$ (MPa) | 3.6 | 6.0 |
| | Middle region | $E'_{20B}$ (MPa) | 3.6 | 3.2 |
| | Internal diameter side region | $E'_{20C}$ (MPa) | 6.0 | 4.5 |
| Outer side reinforcing rubber layer | Presence/absence | | Absent | Absent |
| | $T_{30}$ | | — | — |
| | $E'_{30}$ (ratio to $E'_{10C}$) (MPa) | | — | — |
| Volume ratio | $V_{10C}/(V_{10A}+V_{10B})$ | | — | 1.0 |
| | $V_{20A}/V_{20B}$ | | — | 1.0 |
| | $V_{20C}/V_{20B}$ | | — | 1.0 |
| Run-flat durability (index) | | | 100 | 97 |
| Riding comfort when regular traveling (index) | | | 100 | 102 |

| | | | Working Example 1 | Working Example 2 | Working Example 3 |
|---|---|---|---|---|---|
| Inner side reinforcing rubber layer | Number of layers | | 3 | 3 | 3 |
| | External diameter side region | $T_{10A}$ | 0.04 | 0.04 | 0.04 |
| | | $E'_{10A}$ (MPa) | 5.0 | 5.0 | 5.0 |
| | Middle region | $T_{10B}$ | 0.05 | 0.05 | 0.05 |
| | | $E'_{10B}$ (MPa) | 6.0 | 6.0 | 6.0 |

TABLE 1-continued

|  |  |  |  |  |  |
|---|---|---|---|---|---|
|  | Internal diameter side region | $T_{10C}$ | 0.06 | 0.06 | 0.06 |
|  |  | $E'_{10C}$ (MPa) | 9.0 | 9.0 | 9.0 |
| Outer side rubber layer | Number of layers |  | 3 | 3 | 3 |
|  | External diameter side region | $E'_{20A}$ (MPa) | 4.5 | 4.5 | 4.5 |
|  | Middle region | $E'_{20B}$ (MPa) | 3.2 | 3.2 | 3.2 |
|  | Internal diameter side region | $E'_{20C}$ (MPa) | 6.0 | 6.0 | 6.0 |
| Outer side reinforcing rubber layer | Presence/absence |  | Absent | Absent | Present |
|  | $T_{30}$ |  | — | — | 0.08 |
|  | $E'_{30}$ (ratio to $E'_{10C}$) (MPa) |  | — | — | 4.0 (0.4) |
| Volume ratio | $V_{10C}/(V_{10A}+V_{10B})$ |  | 0.6 | 1.0 | 1.0 |
|  | $V_{20A}/V_{20B}$ |  | 0.6 | 1.0 | 1.0 |
|  | $V_{20C}/V_{20B}$ |  | 0.6 | 1.0 | 1.0 |
| Run-flat durability (index) |  |  | 103 | 105 | 108 |
| Riding comfort when regular traveling (index) |  |  | 105 | 107 | 110 |

|  |  |  | Working Example 4 | Working Example 5 | Working Example 6 |
|---|---|---|---|---|---|
| Inner side reinforcing rubber layer | Number of layers |  | 3 | 3 | 3 |
|  | External diameter side region | $T_{10A}$ | 0.04 | 0.04 | 0.04 |
|  |  | $E'_{10A}$ (MPa) | 5.0 | 5.0 | 5.0 |
|  | Middle region | $T_{10B}$ | 0.05 | 0.05 | 0.05 |
|  |  | $E'_{10B}$ (MPa) | 6.0 | 6.0 | 6.0 |
|  | Internal diameter side region | $T_{10C}$ | 0.06 | 0.06 | 0.06 |
|  |  | $E'_{10C}$ (MPa) | 9.0 | 9.0 | 9.0 |
| Outer side rubber layer | Number of layers |  | 3 | 3 | 3 |
|  | External diameter side region | $E'_{20A}$ (MPa) | 4.5 | 4.5 | 4.5 |
|  | Middle region | $E'_{20B}$ (MPa) | 3.2 | 3.2 | 3.2 |
|  | Internal diameter side region | $E'_{20C}$ (MPa) | 6.0 | 6.0 | 6.0 |
| Outer side reinforcing rubber layer | Presence/absence |  | Present | Present | Present |
|  | $T_{30}$ |  | 0.08 | 0.05 | 0.05 |
|  | $E'_{30}$ (ratio to $E'_{10C}$) (MPa) |  | 4.0 (0.4) | 9.0 (1.0) | 9.0 (1.0) |
| Volume ratio | $V_{10C}/(V_{10A}+V_{10B})$ |  | 1.3 | 1.3 | 1.0 |
|  | $V_{20A}/V_{20B}$ |  | 1.3 | 1.3 | 1.0 |
|  | $V_{20C}/V_{20B}$ |  | 1.3 | 1.3 | 1.0 |
| Run-flat durability (index) |  |  | 105 | 110 | 114 |
| Riding comfort when regular traveling (index) |  |  | 107 | 112 | 116 |

As is clear from Table 1, each of the test tires of Working Examples 1 to 6 displayed run-flat durability and riding comfort when regular traveling superior to that of Conventional Example 1 in which the inner side reinforcing rubber layer had a single layer and the outer side rubber layer had two layers, and that of Comparative Example 1 in which, while the inner side reinforcing rubber layer and the outer side rubber layer each had three layers, the size relationship of the dynamic elastic moduli E' and the tan δ at 60° C. was reversed.

As is clear from Table 1, each of the test tires of Working Examples 1 to 6 displayed run-flat durability and riding comfort when regular traveling superior to that of Conventional Example 1 in which the inner side reinforcing rubber layer had a single layer and the outer side rubber layer had two layers, and that of Comparative Example 1 in which, while the inner side reinforcing rubber layer and the outer side rubber layer each had three layers, the size relationship of the dynamic elastic moduli E' and the tan δ at 60° C. was reversed.

What is claimed is:

1. A pneumatic run flat tire comprising a carcass layer mounted between a pair of left and right bead portions, a belt layer disposed on an outer circumferential side of the carcass layer in a tread portion, and an inner side reinforcing rubber layer having a falcated cross-section disposed on an inner side in a tire width direction of the carcass layer in a side wall portion; wherein:
   the inner side reinforcing rubber layer and an outer side rubber layer positioned on an outer side in the tire width direction of the carcass layer in the side wall portion are divided into an external diameter side region, a middle region, and an internal diameter side region, which are respectively laminated in a tire radial direction such that the external diameter side region is in contact with the middle region and the middle region is in contact with the internal diameter side region;
   a dynamic elastic modulus $E'_{10A}$ at 60° C. of a rubber composition included in the external diameter side region of the inner side reinforcing rubber layer, a dynamic elastic modulus $E'_{10B}$ at 60° C. of a rubber composition included in the middle region of the inner side reinforcing rubber layer, and a dynamic elastic modulus $E'_{10C}$ at 60° C. of a rubber composition included in the internal diameter side region of the inner side reinforcing rubber layer are configured so as to satisfy the relationships $E'_{10A}<E'_{10B}<E'_{10C}$ and $E'_{10A} \geq 4.0$ MPa;

a value $T_{10A}$ of a tan δ at 60° C. of the rubber composition included in the external diameter side region of the inner side reinforcing rubber layer, a value $T_{10B}$ of a tan δ at 60° C. of the rubber composition included in the middle region of the inner side reinforcing rubber layer, and a value $T_{10C}$ of a tan δ at 60° C. of the rubber composition included in the internal diameter side region of the inner side reinforcing rubber layer are configured so as to satisfy the relationships $T_{10A}<T_{10B}<T_{10C}$ and $T_{10A} \leq 0.06$;

a dynamic elastic modulus $E'_{20A}$ at 60° C. of a rubber composition included in the external diameter side region of the outer side rubber layer, a dynamic elastic modulus $E'_{20B}$ at 60° C. of a rubber composition included in the middle region of the outer side rubber layer, and a dynamic elastic modulus $E'_{20C}$ at 60° C. of a rubber composition included in the internal diameter side region of the outer side rubber layer are configured so as to satisfy the relationships $E'_{20B}<E'_{20A} \leq E'_{20C}$ and $E'_{20C}/E'_{20B} \geq 1.6$; and a ratio $E'_{20A}/E'_{10A}$ of the dynamic elastic modulus $E'_{20A}$ at 60° C. of the rubber composition included in the external diameter side region of the outer side rubber layer to the dynamic elastic modulus $E'_{10A}$ at 60° C. of the rubber composition included in the external diameter side region of the inner side reinforcing rubber layer, and a ratio $E'_{20C}/E'_{10C}$ of the dynamic elastic modulus $E'_{20C}$ at 60° C. of the rubber composition included in the internal diameter side region of the outer side rubber layer to the dynamic elastic modulus $E'_{10C}$ at 60° C. of the rubber composition included in the internal diameter side region of the inner side reinforcing rubber layer are configured so as to satisfy the relationships $0.6 \leq E'_{20A}/E'_{10A} \leq 1.0$ and $0.6 \leq E'_{20C}/E'_{10C} \leq 1.0$.

2. The pneumatic run flat tire according to claim 1, wherein:

a ratio $V_{10C}/(V_{10A}+V_{10B})$ of a volume $V_{10C}$ of the internal diameter side region of the inner side reinforcing rubber layer to a sum of a volume $V_{10A}$ of the external diameter side region of the inner side reinforcing rubber layer and a volume $V_{10B}$ of the middle region of the inner side reinforcing rubber layer is configured so as to satisfy the relationship $0.8 \leq V_{10C}/(V_{10A}+V_{10B}) \leq 1.2$;

a ratio $V_{20A}/V_{20B}$ of the volume $V_{20A}$ of the external diameter side region of the outer side rubber layer to the volume $V_{20B}$ of the middle region of the outer side rubber layer is configured so as to satisfy the relationship $0.8 \leq V_{20A}/V_{20B} \leq 1.2$; and a ratio $V_{20C}/V_{20B}$ of the volume $V_{20C}$ of the internal diameter side region of the outer side rubber layer to the volume $V_{20B}$ of the middle region of the outer side rubber layer is configured so as to satisfy the relationship $0.8 \leq V_{20C}/V_{20B} \leq 1.2$.

3. The pneumatic run flat tire according to claim 2, wherein an outer side reinforcing rubber layer is provided throughout the internal diameter side region and the middle region of the outer side rubber layer on an outer side in the tire width direction of the carcass layer and on an inner side in the tire width direction of the outer side rubber layer.

4. The pneumatic run flat tire according to claim 3, wherein a value $T_{30}$ of a tan δ at 60° C. of a rubber composition constituting the outer side reinforcing rubber layer is from 0.01 to 0.06, and a dynamic elastic modulus $E_{30}$ at 60° C. of the rubber composition constituting the outer side reinforcing rubber layer is from 0.8 to 1.2 times the dynamic elastic modulus $E'_{10C}$ at 60° C. of the rubber composition included in the internal diameter side region of the inner side reinforcing rubber layer.

5. The pneumatic run flat tire according to claim 1, wherein an outer side reinforcing rubber layer is provided throughout the internal diameter side region and the middle region of the outer side rubber layer on an outer side in the tire width direction of the carcass layer and on an inner side in the tire width direction of the outer side rubber layer.

6. The pneumatic run flat tire according to claim 5, wherein a value $T_{30}$ of a tan δ at 60° C. of a rubber composition constituting the outer side reinforcing rubber layer is from 0.01 to 0.06, and a dynamic elastic modulus $E_{30}$ at 60° C. of the rubber composition constituting the outer side reinforcing rubber layer is from 0.8 to 1.2 times the dynamic elastic modulus $E'_{10C}$ at 60° C. of the rubber composition included in the internal diameter side region of the inner side reinforcing rubber layer.

7. The pneumatic run flat tire according to claim 5, wherein a value $T_{30}$ of a tan δ at 60° C. of a rubber composition constituting the outer side reinforcing rubber layer is from 0.01 to 0.06.

8. The pneumatic run flat tire according to claim 5, wherein a dynamic elastic modulus $E'_{30}$ at 60° C. of a rubber composition constituting the outer side reinforcing rubber layer is from 0.8 to 1.2 times the dynamic elastic modulus $E'_{10C}$ at 60° C. of the rubber composition included in the internal diameter side region of the inner side reinforcing rubber layer.

9. The pneumatic run flat tire according to claim 1, wherein a ratio $E'_{10C}/E'_{10A}$ of the dynamic elastic modulus $E'_{10C}$ at 60° C. of a rubber composition included in the internal diameter side region of the inner side reinforcing rubber layer to the dynamic elastic modulus $E'_{10A}$ at 60° C. of the rubber composition included in the external diameter side region of the inner side reinforcing rubber layer is configured so as to satisfy the relationship $E'_{10C}/E'_{10A} \geq 1.5$.

10. The pneumatic run flat tire according to claim 1, wherein a ratio $V_{10A}/V_{10B}$ of the volume $V_{10A}$ of the external diameter side region of the inner side reinforcing rubber layer to the volume $V_{10B}$ of the middle region of the inner side reinforcing rubber layer is configured such that $0.8 \leq V_{10A}/V_{10B} \leq 1.2$.

11. The pneumatic run flat tire according to claim 1, wherein a ratio $V_{10C}/(V_{10A}+V_{10B})$ of a volume $V_{10C}$ of the internal diameter side region of the inner side reinforcing rubber layer to a sum of a volume $V_{10A}$ of the external diameter side region of the inner side reinforcing rubber layer and a volume $V_{10B}$ of the middle region of the inner side reinforcing rubber layer is configured so as to satisfy the relationship $0.8 \leq V_{10C}/(V_{10A}+V_{10B}) \leq 1.2$.

12. The pneumatic run flat tire according to claim 1, wherein a ratio $V_{20A}/V_{20B}$ of the volume $V_{20A}$ of the external diameter side region of the outer side rubber layer to the volume $V_{20B}$ of the middle region of the outer side rubber layer is configured so as to satisfy the relationship $0.8 \leq V_{20A}/V_{20B} \leq 1.2$.

13. The pneumatic run flat tire according to claim 1, wherein a ratio $V_{20C}/V_{20B}$ of the volume $V_{20C}$ of the internal diameter side region of the outer side rubber layer to the volume $V_{20B}$ of the middle region of the outer side rubber layer is configured so as to satisfy the relationship $0.8 \leq V_{20C}/V_{20B} \leq 1.2$.

* * * * *